J. McCORMICK, H. A. SIMPSON & B. H. HILL.
FEED WATER REGULATOR.
APPLICATION FILED DEC. 29, 1914.

1,184,862.

Patented May 30, 1916.
2 SHEETS—SHEET 1.

WITNESSES
W. T. Holman
Elbert L. Hyde

INVENTORS
John McCormick,
Hugh A. Simpson
Buchanan H. Hill,
By Fred. W. Winter
Attorney

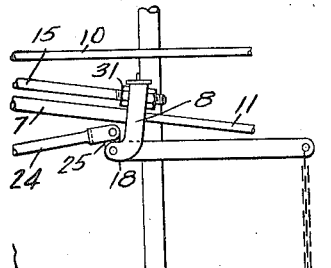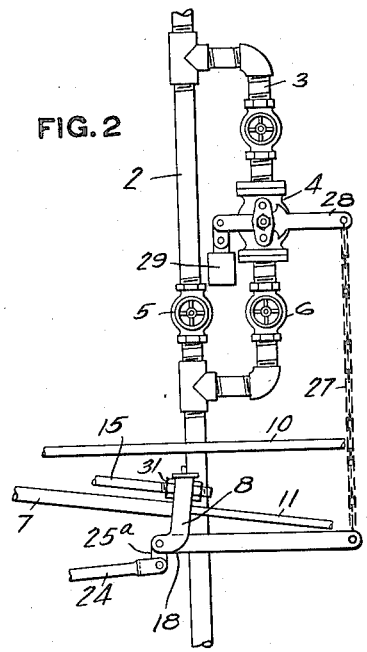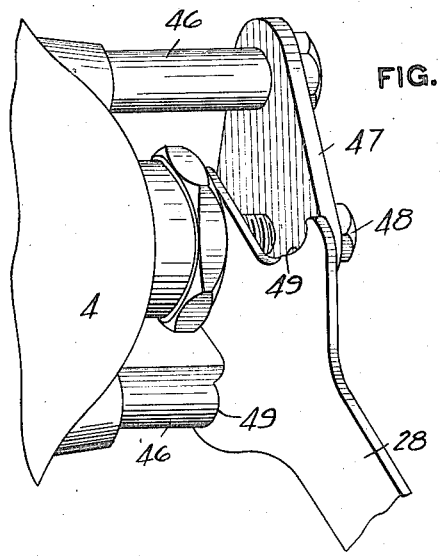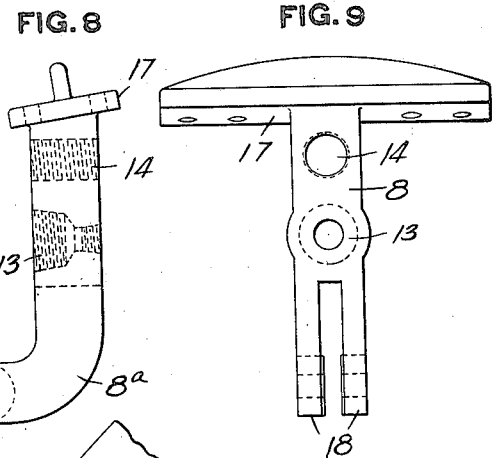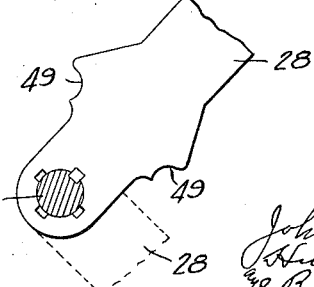

UNITED STATES PATENT OFFICE.

JOHN McCORMICK AND HUGH A. SIMPSON, OF WILMERDING, AND BUCHANAN HOUSTON HILL, OF PITTSBURGH, PENNSYLVANIA, ASSIGNORS TO STEAM EQUIPMENT MANUFACTURING COMPANY, OF PITTSBURGH, PENNSYLVANIA, A CORPORATION OF PENNSYLVANIA.

FEED-WATER REGULATOR.

1,184,862.  Specification of Letters Patent.  Patented May 30, 1916.

Application filed December 29, 1914. Serial No. 879,615.

*To all whom it may concern:*

Be it known that we, JOHN McCORMICK, HUGH A. SIMPSON, and BUCHANAN HOUSTON HILL, residents, respectively, of Wilmerding, Wilmerding, and Pittsburgh, in the county of Allegheny and State of Pennsylvania, have invented a new and useful Improvement in Feed-Water Regulators, of which the following is a specification.

This invention relates to feed water regulators for steam boilers.

One object of the invention is to provide a feed water regulator which can be readily adapted to any boiler and which is adjustable to accommodate different arrangements or locations of the feed water supply pipe.

Another object of the invention is to provide a feed water regulator in which the operating connections to the regulating valve are so arranged as to prevent strain upon the parts under abnormal conditions, as when the temperature of the water in the expansion tube gets very low.

A further object of the invention is to provide a feed water regulator in which the feed valve will not stick or vary as to the frictional resistance on its seat, and one whereby a gradual and uniform supply of water to the boiler is secured, which does away with a variable or lumpy feed and consequently produces a uniform steaming capacity.

A further object of the invention is to provide a feed water regulator which can be readily attached to any style of boiler and does not require special fitting thereto.

Figure 1:
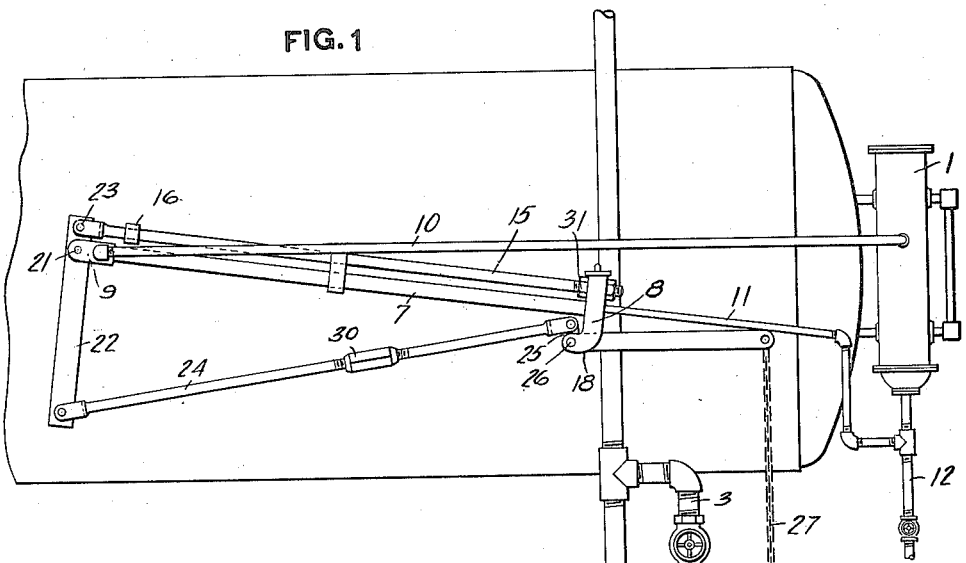
Figure 4:
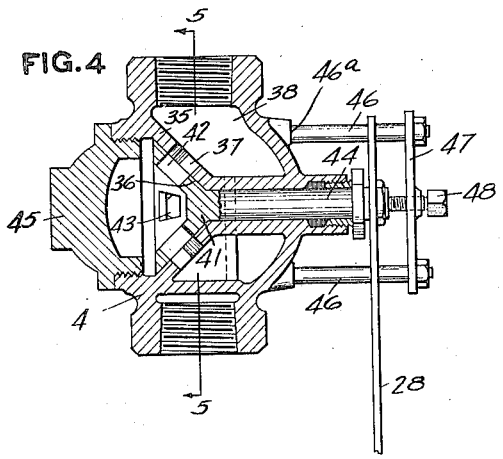
Figure 5:
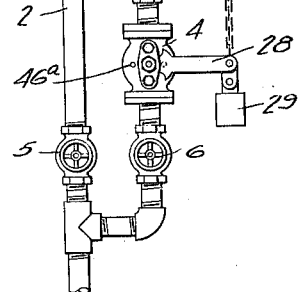
Figure 10:
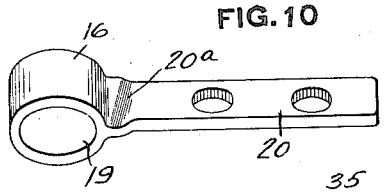
Figure 6:
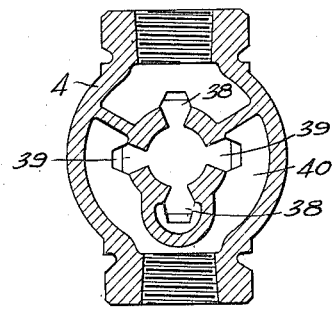

In the drawings, which represent one embodiment of the invention, Figure 1 is an elevation of the regulating device applied to a boiler; Figs. 2 and 3 are detail views, showing modified arrangements of the connections to the regulating valve; Fig. 4 is a longitudinal sectional view of one form of regulating valve; Fig. 5 is a sectional view through the valve, on the line 5—5. Fig. 1; Fig. 6 is a detail view of the ports in the valve and seat; Fig. 7 is a detail perspective view showing the valve operating lever and its stops; Figs. 8 and 9 are enlarged detail views of a water head; Fig. 10 is a similar view of a support; and Fig. 11 is a detail view of the valve operating lever.

Referring to the drawings, 1 represents a water column or other suitable portion of the steam boiler which is to be supplied with water.

2 is the water supply pipe coming from any suitable source of supply and leading to the water space in the boiler. In this supply pipe is a by-pass 3 having the feed water regulating valve 4 therein. Hand regulating valves 5 and 6 control the flow of water through the main conduit and by-pass respectively. The boiler can obviously be of any type.

The thermostatic regulating device comprises an expansion tube 7 of some metal having a high co-efficient of expansion, which expansion tube at one end is secured to the stationary water head 8 and at its opposite end to the movable head 9. The movable head 9 has a pipe connection 10 to the water column 1 or other suitable portion of the boiler at a point above the highest water level to be maintained in the boiler, while the stationary head 8 has a pipe connection 11 to a pipe 12 leading to the waste space or other suitable part of the boiler so that the expansion tube crosses the water line. It is obvious that since one end of the expansion tube is connected to the steam space and the other to the water space in the boiler said tube will be filled partly with live steam and partly with water and that cooling of the water therein by conduction of its heat to the outside air and the constant effect of the steam therein will cause the tube to expand or contract more or less depending upon the water level in the boiler and the relative amounts of steam and water in the tube. The expansion and contraction of the tube automatically operate the water supply valve, as more fully hereinafter described.

Stationary water head 8 is preferably so arranged as to be readily applicable to an ordinary boiler without special fitting. It also forms a support for one of the lever connections for operating the supply valve and is so arranged as to enable said lever to be reversed therein. As shown in Figs. 8 and 9, this stationary head is a solid shank or member having a cross bore 13 threaded at both ends to receive the pipes 7 and 11 for connecting the same. It also has a threaded aperture 14 for receiving an adjustable tension rod 15, whose other end forms a fulcrum for an operating lever and is carried by a support 16. When applied to the boiler the water head 8 is slightly inclined to the vertical, as shown in Fig. 1, so as to give the expansion tube 7 the proper inclination. For this purpose it is provided at its upper end with a flat head comprising a lateral extension 17 lying in a plane at an angle to the axis of the shank and extending in both directions therefrom so that it may be used on either side of a boiler. The inclination of the shank to the plane of the extension 17 is such that when said extension is bolted to a horizontal flange or support carried by the boiler the expansion tube will have the proper inclination. The lower end of the water head has a lateral extension 8$^a$ which is bifurcated to form two arms 18 for supporting an operating lever, as hereinafter described. The support 16 for the tension rod 15 comprises a sleeve portion 19 having a lateral extension 20 provided with apertures for receiving bolts or rivets for attaching it to the boiler and which may be twisted slightly, as shown at 20$^a$, to fit a horizontal flange and still give the proper inclination to the sleeve 19.

The connection between the expansion tube 7 and the supply valve 4 is as follows: The movable head 9 is pivotally connected at 21 to a working lever 22 fulcrumed at 23 on the end of the tension rod 15. From the free end of the lever 22 a connecting rod 24 leads to the short arm 25 of a bellcrank lever fulcrumed at 26 between the arms 18 on the lower end of the stationary water head 8. The other arm of the bellcrank lever is connected by some flexible but non-extensible member, such as a chain, cable or wire 27, to the arm or lever 28 to which is connected a suitable counterweight 29.

In order to adjust the mechanism while setting it for a given boiler the connecting rod 24 may be adjustable in length, such as by means of the turn buckle 30, or the tension rod 15 may be adjustably connected to the fixed member to which it is attached, such as by means of nuts 31 on the opposite sides of the stationary head 8, which permit said tension rod to be adjusted lengthwise.

The supply valve 4 may be of any suitable type, but is shown as a rotary valve, being actuated by the arm 28. The body of this valve is provided with a partition 35 in which is a conical valve seat 36 provided with two or more openings therethrough, the specific valve illustrated showing four such openings, two openings 37 connecting with the space 38 on the supply side of the partition 35 and the other two openings 39 communicating with a space 40 on the discharge side of said partition 35. Working on the conical valve seat is a hollow conical rotary valve or plug 41 provided with openings 42 and 43 therethrough, corresponding in shape, number and arrangement with the openings 37 and 39 in the valve seat. The stem 44 of said rotary valve or plug extends out through the side of the casing and has keyed thereto the arm or lever 28, which can be set in different positions for different arrangements of the valve, as shown in dotted lines, Fig. 11. The opposite side of the body of the valve is closed by a removable cap 45 for the insertion and removal of the valve or plug. In order to minimize the friction of the valve on its seat and secure smooth and effective operation, suitable means is provided for counteracting the back pressure of the water in the boiler. As shown, the valve casing is provided with two projecting rods or bars 46 having a cross head 47 attached to the outer ends thereof and into which is threaded a pressure screw 48 whose inner end contacts with the outer end of the valve stem. This pressure screw takes the thrust of the valve stem against its seat and secures smooth operation irrespective of the water pressure. The bars 46 also form stops for coöperation with side shoulders 49 on the lever 28 to limit its movement in both directions. The valve casing is preferably provided with two sets of oppositely disposed threaded holes 46$^a$ for receiving the rods 46 and which enable the valve to be set in either vertical or horizontal position, as more fully hereinafter described.

The ports or openings in the valve are of such size that rotation of the valve through an angle of 45 degrees completely opens and closes the passage through the valve. They are also preferably constructed as shown in Fig. 6, to wit, with the end edges or walls of the seat ports 37 and 39 inclined to each other to form V-shaped extensions 50 at the ends of the ports while the end edges of the valve ports are straight. When the valve is closed the openings are out of register, but by rotating the lever 28 slightly the openings come into register, first as a small point at the ends of the extensions 50 and then by an increasing amount so that first only a small amount of water passes through the valve, said amount increasing uniformly and gradually to maximum supply position. The expansion of the tube 7 is of course slight, but the arrangement of the pivotal connections on the working lever 22 and the relative lengths of the arms of the bellcrank lever twice amplifies this expansion so that with a very small expansion a considerable movement of the valve is secured.

In order to adapt the regulator for various boilers in which the water supply pipes are located at different positions, the bellcrank lever 25$^a$ is reversible in its support, its pivot being removable for this purpose. For example, Fig. 2 shows an arrangement in which the feed water supply valve is above instead of below the regulating device. In this case the bell-crank lever is attached to the stationary head with its short arm extending downwardly instead of upwardly, so that expansion of the tube 7 lowers instead of lifts the long arm of the bell-crank lever. The bell-crank lever is attached to the valve handle by a chain or cable as before, but the counterweight 29 is placed on the opposite side of the valve stem. The regulating valve can also be placed in a horizontal portion of the water supply pipe, as shown in Fig. 3.

In setting the apparatus the chain or cable 27 is made of such length that the handle 28 contacts, with one of the bars 46 on the opening movement of the valve only under extreme hot conditions, which never vary for a given boiler. In other words, the maximum elongation of the expansion tube 7 is fixed for each boiler, and the valve operating lever will not contact with its stop until this point has been reached. Consequently, neither the operating mechanism nor the valve parts will be subjected to strain by expansion of the tube. However, the contraction of the tube is not fixed but depends upon external temperature conditions which vary with the season of the year. For this purpose the valve is closed by a weight and is connected to the operating mechanism by a flexible member, which permits the expansion tube to contract to any amount even to a point which would carry the lever 28 beyond its stop, without straining the parts of the operating mechanism or of the valve.

With the arrangement described the feed water is supplied to the boiler gradually so that sudden cooling of the water and boiler metal is avoided and the feed water supply is practically uniform and constant. It also enables the use of a type of valve which when open has the same area as the feed pipe and the regulation of said valve is so exact and the amplification of the tube expansion produces such a large valve travel that even with the large valve the feed water is supplied in exact accordance with the rate of steam consumption, due to the ability of the valve to supply any amount between zero and 100 per cent. In operation the valve is rarely if ever fully closed, but forms always a small supply passage therethrough, the size of which varies upon slight rising or falling of the water level in the boiler and tube. Furthermore, the valve is so arranged that the pressure on its seat is uniform and it will not stick so that failure of the valve to act is almost entirely avoided.

What we claim is:—

1. In a feed water regulator, the combination of an expansion device controlled by the water level, a valve operated by said expansion device and controlling the water supply, and connections between said device and valve for operating the latter, said connections including a pivoted two-armed lever, said lever being reversible about an axis in its plane of movement and adapted to be connected to its pivot in two different positions, and be thereby adapted in said two positions to operate differently located valves.

2. In a feed water regulator, the combination of an expansion device controlled by the water level, a working lever connected to said expansion device and whose free end has a greater movement than said device, a bell-crank lever having unequal arms the shorter of which is connected to said working lever, a regulating valve, a positive stop limiting closing movement of said valve, and a flexible connection between the longer arm of said bell-crank lever and said valve.

3. In a feed water regulator, the combination of an expansion device controlled by the water level, a working lever connected to said expansion device and whose free end has a greater movement than said device, a bell-crank lever having unequal arms the shorter of which is connected to said working lever, a regulating valve, a positive stop for limiting closing movement of said valve, a flexible connection between the longer arm of said bell-crank lever and said valve, and a counterweight connected to said valve.

4. In a feed water regulator embodying an expansion tube, a valve for controlling the water supply, operating devices connecting one end of said tube to said valve, and a stationary water head comprising a member having a cross aperture threaded at one end for connection to said tube and at its opposite end for connection to the boiler, said member at one end being provided with a lateral extension having a flat surface lying in a plane at an angle to the length of said water head and adapted for attachment to a horizontal support on said boiler.

5. In a feed water regulator embodying an expansion tube, a valve for controlling the water supply and lever mechanism connecting one end of said tube to said valve, and a stationary water head comprising a member having a cross aperture threaded at one end for connection to said tube and at its opposite end for connection to the boiler, said member at one end being provided with an extension projecting laterally in both directions and having a flat surface lying in a plane at an angle to the length of said water head and adapted for attachment to a horizontal support on said boiler, the other end of said water head being provided with a bifurcated lateral extension forming two arms for supporting one of the levers of said lever mechanism.

6. In a feed water regulator, the combination of an expansion device controlled by the water level, a movable supply valve having an operating arm, stops for limiting the movement of said arm in both directions, and a flexible connection between said expansion device and said arm.

7. In a feed water regulator, the combination of an expansion device controlled by the water level, a movable supply valve having an operating arm, stops for limiting the movement of said arm in both directions, a flexible connection between said expansion device and said arm, and a counterweight connected to said valve.

In testimony whereof, we have hereunto set our hands.

JOHN McCORMICK.
HUGH A. SIMPSON.
BUCHANAN HOUSTON HILL.

Witnesses:
ELBERT L. HYDE,
GLENN H. LERESCHE.